United States Patent
Kwon et al.

(10) Patent No.: US 8,493,895 B2
(45) Date of Patent: Jul. 23, 2013

(54) METHOD FOR TRANSMITTING SUB-FRAME DESIGNATION INFORMATION TO A DOWNLINK IN A RADIO COMMUNICATION SYSTEM

(75) Inventors: Yeong Hyeon Kwon, Anyang-si (KR); Min Seok Noh, Anyang-si (KR); Kyu Jin Park, Anyang-si (KR); Jae Hoon Chung, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 38 days.

(21) Appl. No.: 13/230,542

(22) Filed: Sep. 12, 2011

(65) Prior Publication Data
US 2012/0039232 A1 Feb. 16, 2012

Related U.S. Application Data (63) Continuation of application No. 12/988,240, filed as application No. PCT/KR2009/006609 on Nov. 11, 2009, now Pat. No. 8,040,827.

(60) Provisional application No. 61/113,233, filed on Nov. 11, 2008.

(30) Foreign Application Priority Data

Jun. 9, 2009 (KR) ......................... 10-2009-0050872

(51) Int. Cl.
*H04L 5/14* (2006.01)
*H04J 1/14* (2006.01)

(52) U.S. Cl.
USPC .......................................... 370/295; 370/496

(58) Field of Classification Search
None
See application file for complete search history.

(56) References Cited

U.S. PATENT DOCUMENTS

| 7,869,402 | B2 | 1/2011 | Yoon et al. |
| 8,351,974 | B2 * | 1/2013 | Ahn et al. ............. 455/522 |
| 2008/0080476 | A1 | 4/2008 | Cho et al. |
| 2008/0232495 | A1 | 9/2008 | Yu et al. |
| 2009/0274109 | A1 | 11/2009 | Zhang et al. |
| 2010/0034135 | A1 | 2/2010 | Kim et al. |

(Continued)

FOREIGN PATENT DOCUMENTS

| CN | 101227230 A | 7/2008 |
| KR | 10-2008-0030859 A | 4/2008 |

(Continued)

OTHER PUBLICATIONS

U.S. Appl. No. 61/040,138, filed Mar. 27, 2008, Koskinen (inventor), "Apparatus and Method for Allocation of Subframes on a Mixed Carrier".*

(Continued)

*Primary Examiner* — Gregory Sefcheck
(74) *Attorney, Agent, or Firm* — McKenna Long & Aldridge LLP (57) ABSTRACT

A method of transmitting subframe designating information in downlink in a wireless communication system is disclosed. The present invention includes generating the subframe designating information for designating a subframe of a specific type in a radio frame and transmitting the generated subframe designating information to a user equipment, wherein the subframe designating information includes initial location information indicating an initial location of the subframe of the specific type on the radio frame and period information indicating a period for the subframe of the specific type to be repeated.

16 Claims, 6 Drawing Sheets

U.S. PATENT DOCUMENTS

| | | |
|---|---|---|
| 2010/0080139 A1 | 4/2010 | Palanki et al. |
| 2010/0080166 A1 | 4/2010 | Palanki et al. |
| 2010/0110964 A1 | 5/2010 | Love et al. |
| 2010/0118800 A1 | 5/2010 | Kim et al. |
| 2010/0215004 A1 | 8/2010 | Yoo |
| 2011/0002293 A1 | 1/2011 | Yuk et al. |
| 2011/0013554 A1* | 1/2011 | Koskinen .................. 370/315 |
| 2011/0051654 A1 | 3/2011 | Blankenship et al. |
| 2011/0051681 A1 | 3/2011 | Ahn et al. |
| 2011/0194523 A1* | 8/2011 | Chung et al. ............... 370/329 |
| 2011/0211522 A1* | 9/2011 | Chung et al. ............... 370/315 |
| 2012/0220214 A1 | 8/2012 | Du et al. |

FOREIGN PATENT DOCUMENTS

| | | |
|---|---|---|
| KR | 10-2008-0059001 A | 6/2008 |
| KR | 10-2008-0067316 A | 7/2008 |
| KR | 10-2008-0072489 A | 8/2008 |
| WO | WO 2006/105005 A2 | 10/2006 |

OTHER PUBLICATIONS

U.S. Appl. No. 12/988,240, filed Oct. 15, 2010.
"MBSFN Subframe Allocation", 3GPP TSG-RAN WG2 Meeting #61 bis R2-081626, Mar. 31, 2008.
"Signaling of the MBSFN subframe allocation parameter", 3GPP TSG-RAN WG2 #62 Tdoc R2-082166, May 5, 2008.
"Signalling of MBSFN subframe allocation on mixed carrier", 3GPP TSG-RAN WG2 Meeting #62 R2-082162, May 5, 2008.
"MBSFN subframe allocation for different service capacities", 3GPP TSG-RAN2 #62 R2-082192, May 5, 2008.

* cited by examiner

METHOD FOR TRANSMITTING SUB-FRAME DESIGNATION INFORMATION TO A DOWNLINK IN A RADIO COMMUNICATION SYSTEM

CROSS-REFERENCE

This application is a continuation of and claims the benefit of U.S. application Ser. No. 12/988,240, now U.S. Pat. No. 8,040,827, filed Oct. 15, 2010, and claims priority benefit to U.S. Provisional Application No. 61/113,233, filed Nov. 11, 2008, and Korean Patent Application No. 10-2009-0050872, filed Jun. 9, 2009, the contents of each of the above-recited applications are incorporated by reference herein.

TECHNICAL FIELD

The present invention relates to a mobile communication technology, and more particularly, to a method of transmitting subframe designating information in downlink.

BACKGROUND ART

In the following description, assume that 'legacy system' means a predefined system in advance and that 'evolved system' means a system evolved from the legacy system or a newly defined system.

'Legacy support' means to support a legacy system in transmitting and receiving relations with an evolved system. And, assume that the following two conditions are met in a broad sense.

First of all, a legacy base station (hereinafter abbreviated BS) and a legacy mobile station (hereinafter abbreviated MS) are able to transmit and receive signals without being affected by an evolved system. And, signal transmission and reception can be performed between the legacy BS and an evolved MS.

Secondly, a BS available for both legacy and evolved systems are able to transmit and receive signals to/from a legacy MS and an evolved MS both.

For clarity and convenience of the following description, 3GPP LTE ($3^{rd}$ generation partnership project long term evolution) system is assumed as a legacy system and 3GPP LTE-advanced (hereinafter abbreviated LTE-A) system is assumed as an evolved system.

After a basic configuration of system has been established, if a new service is added, a problem of legacy support is always caused. Specifically, a system needs to be evolved in a direction for not affecting performance of a legacy system. For this, an important control channel used for a legacy system should be protected. Yet, it is not preferable that the protection for the legacy system degrades performance of a new technical component.

Figure 1:
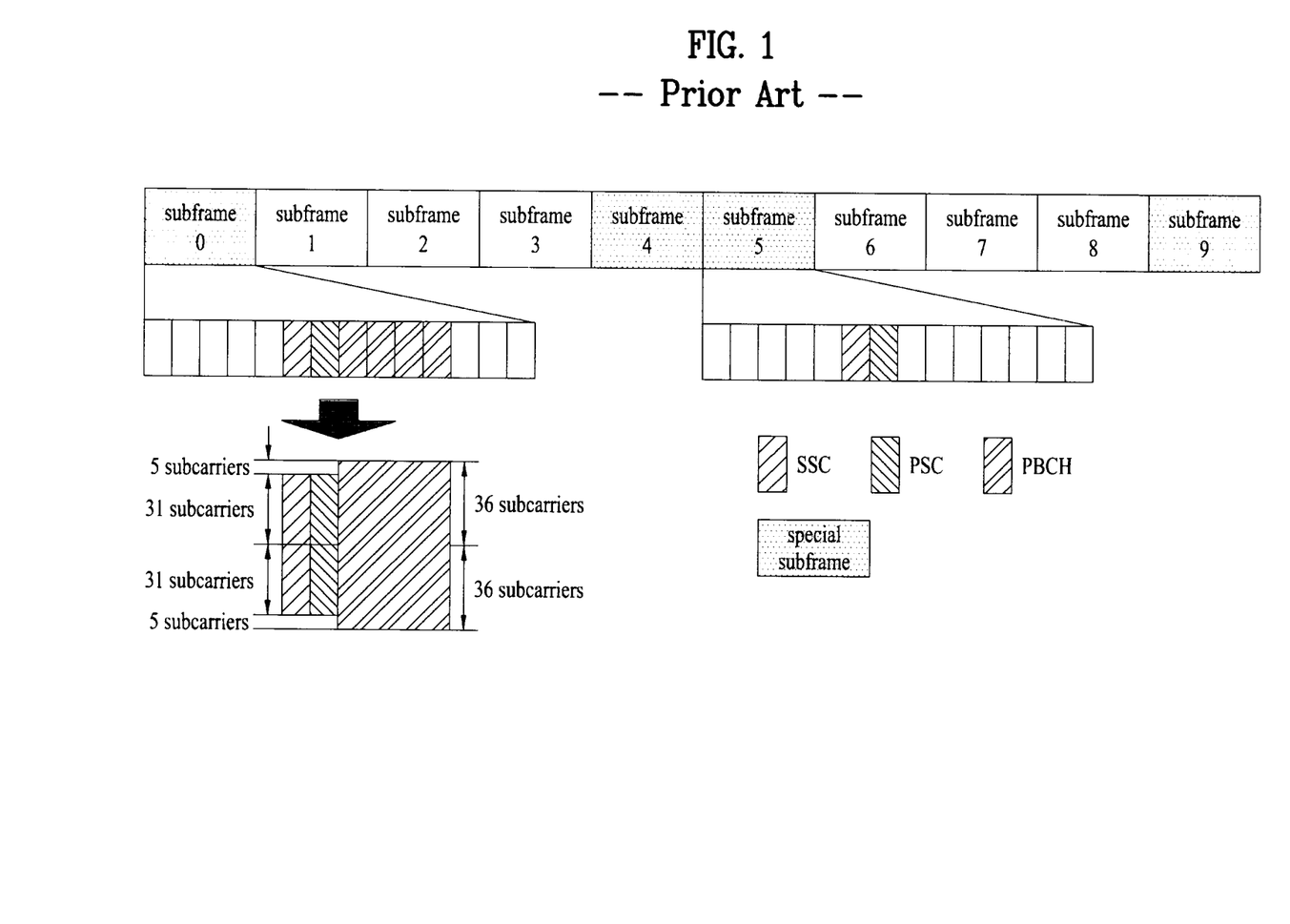
FIG. 1 is a diagram of a radio FDD (frequency division duplexing) frame structure in 3GPP LTE system in case of a normal cyclic prefix (CP)

FIG. 1 is a diagram of a radio FDD (frequency division duplexing) frame structure in 3GPP LTE system in case of a normal cyclic prefix (CP).

Referring to FIG. 1, in the radio frame structure, one radio frame (e.g., a length of the radio frame is 10 ms) is constructed with total 10 subframes (e.g., a length of each subframe is 1 ms). And, usages of some of the subframes are specified. In particular, usages of $0^{th}$, $4^{th}$, $5^{th}$, and $9^{th}$ subframes are specified as follows.

First of all, the $0^{th}$ and $5^{th}$ subframes (i.e., subframe 0 and subframe 5 shown in FIG. 1) are configured to carry primary synchronization channel (PSCH) and secondary synchronization channel (SSCH) for a synchronization signal, respectively. The $0^{th}$ subframe is configured to carry a physical broadcast channel (PBCH) as well as the synchronization signal. Therefore, the $0^{th}$ subframe in a system is configured to carry the SSCH, PSCH, and PBCH and the $5^{th}$ subframe is configured to carry the SSCH and PSCH. A $4^{th}$ subframe (represented as subframe 4 in FIG. 1) is configured to carry SIB (system information block) information. And, a $9^{th}$ subframe (represented as subframe 9 in FIG. 1) is defined as a special subframe for unicast.

Particularly, in each of the $0^{th}$ and $5^{th}$ subframes, a $5^{th}$ OFDM (orthogonal frequency division multiplexing) symbol is an OFDM symbol for carrying SSCH and a $6^{th}$ OFDM symbol is an OFDM symbol for carrying PSCH. In the $0^{th}$ subframe, $7^{th}$ to $10^{th}$ OFDM symbols are OFDM symbols for carrying PBCH.

Figure 2:
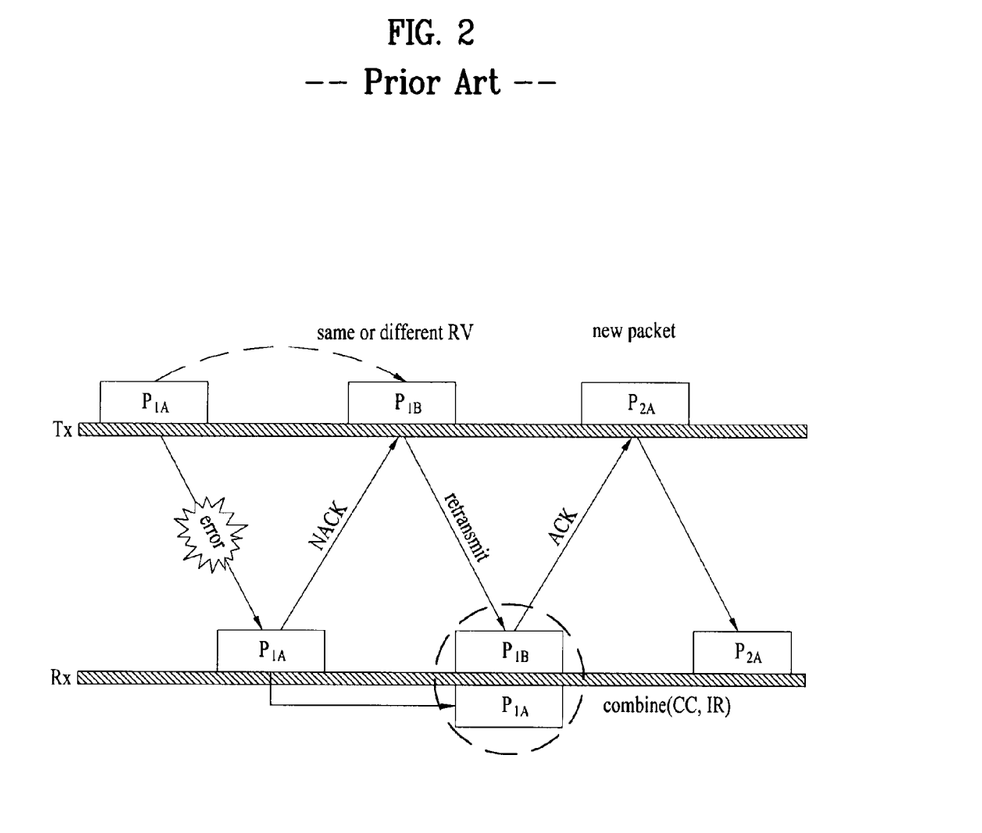
FIG. 2 is a diagram for explaining a principle of HARQ (hybrid automatic repeat request)

FIG. 2 is a diagram for explaining a principle of HARQ (hybrid automatic repeat request).

Referring to FIG. 2, HARQ is the hybrid technique generated from combining ARQ technique of MAC layer and channel coding scheme of physical layer together, as inferred from the name of the HARQ. In HARQ, since an initially transmitted packet, which is erroneous, is a signal $P_{1A}$ having a prescribed information size, it is stored rather than discarded until a retransmitted signal is received. Soft combining is then performed on the stored signal together with the retransmitted signal $P_{1B}$. Alternatively, a signal is decoded by a different method using the initially transmitted signal and the retransmitted signal together. In FIG. 2, the $P_{1A}$ and the $P_{1B}$ are rendered from the same information bit, i.e., the same channel encoder input packet $P_1$ and are transmission packets identical to each other or slightly different from each other, respectively. And, $P_{2A}$ indicates a packet rendered from a new channel encoder input packet $P_2$.

In the above described frame structure, a physical structure of data communication uses HARQ but its period is defined as Hp (e.g., 8 ms). This means a structure that Hp processes can be carried on subframes by being interlaced, respectively. Hence, it can be observed that they can be repeated with Hp subframe interval.

On the contrary, if a transmit unit of a radio frame transmitted by a base station is set to Rp, the radio frame is repeatedly transmitted by a period Rp (e.g., 10 ms) that is the transmit unit of the radio frame.

Under this circumstance, if a subframe of a specific type is designated, how to configure subframe designating information of the specific type causes a problem. For instance, the subframe of the specific type can include one of MBSFN (Multimedia Broadcast multicast service Single Frequency Network) subframe, relay subframe, blank subframe, Positioning subframe, LTE-A subframe, and the like.

DISCLOSURE OF THE INVENTION

Technical Problem

Technical Solution

Accordingly, the present invention is directed to a method of transmitting subframe designating information in downlink that substantially obviates one or more of the problems due to limitations and disadvantages of the related art.

In case that a subframe of a specific type is designated, an object of the present invention is to provide a method of transmitting information on the designation in a wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting subframe designating information, which is transmitted in downlink in a wireless communication system, includes the steps of generating the subframe designating information for designating a subframe of a specific type in a radio frame and transmitting the generated subframe designating information to a user equipment, wherein the subframe designating information includes initial location information indicating an initial location of the subframe of the specific type on the radio frame and period information indicating a period for the subframe of the specific type to be repeated.

Preferably, the radio frame is a radio FDD (frequency division duplexing) frame, the radio frame includes 10 subframes, and the subframe designating information includes the initial location information and the period information on at least one of the rest of the 10 subframes except $0^{th}$, $4^{th}$, $5^{th}$, and $9^{th}$ subframes of the 10 subframes.

Preferably, the subframe of the specific type includes at least one selected from the group consisting of an MBSFN (Multimedia Broadcast multicast service Single Frequency Network) subframe, a relay subframe, a positioning subframe, an LTE-A (Long Term Evolution-Advanced) subframe, and a CSI-RS subframe.

To further achieve these and other advantages and in accordance with the purpose of the present invention, a method of transmitting subframe designating information, which is transmitted in downlink in a wireless communication system, includes the steps of generating the subframe designating information for designating a subframe of a specific type in at least one radio FDD (frequency division duplexing) frame and transmitting the generated subframe designating information to a user equipment, wherein the at least one radio FDD frame includes 10 subframe and wherein the subframe designating information includes bitmap information for designating some of the 10 subframes to subframes of the specific type.

Preferably, the bitmap information includes 6-bit information for designating the subframe of the specific type within the at least one radio FDD frame, bits of the 6-bit information indicate whether $1^{st}$, $2^{nd}$, $3^{rd}$, $6^{th}$, $7^{th}$, $8^{th}$ subframes within the at least one radio FDD frame are designated from the far left side of the 6-bit information to the subframes of the specific type. If each of the bits is set to 1, it indicates that the corresponding subframe is set to the subframe of the specific type.

Preferably, the bitmap information includes 24-bit information for designating the subframes of the specific type within 4 consecutive radio FDD frames. In this case, bits of the 24-bit information indicate whether $1^{st}$, $2^{nd}$, $3^{rd}$, $6^{th}$,$7^{th}$, $8^{th}$ subframes within each of the radio FDD frames starting from a first one of the 4 consecutive radio FDD frames are designated from the far left side of the 24-bit information to the subframes of the specific type, and wherein if each of the bits is set to 1, it indicates that the corresponding subframe is set to the subframe of the specific type.

More preferably, the subframe of the specific type includes at least one selected from the group consisting of an MBSFN (Multimedia Broadcast multicast service Single Frequency Network) subframe, a relay subframe, a positioning subframe, an LTE-A (Long Term Evolution-Advanced) subframe, and a CSI-RS subframe.

To further achieve these and other advantages and in accordance with the purpose of the present invention, a method of transmitting subframe designating information, which is transmitted in downlink in a wireless communication system, includes the steps of generating the subframe designating information for designating a subframe of a specific type in at least one radio frame and transmitting the generated subframe designating information to a user equipment, wherein the radio frame includes a prescribed number of subframes and wherein the subframe designating information includes pattern information representing a location of the subframe of the specific type within the at least one radio frame as a pattern.

Preferably, the at least one radio frame is a radio FDD (frequency division duplexing) frame, the radio FDD frame includes 10 subframes, and the subframe designating information includes the pattern information for setting the rest of the 10 subframes except $0^{th}$, $4^{th}$, $5^{th}$, and $9^{th}$ subframes of the 10 subframes to the subframes of the specific type.

Preferably, the subframe of the specific type includes at least one selected from the group consisting of an MBSFN (Multimedia Broadcast multicast service Single Frequency Network) subframe, a relay subframe, a positioning subframe, an LTE-A (Long Term Evolution-Advanced) subframe, and a CSI-RS subframe.

It is to be understood that both the foregoing general description and the following detailed description are exemplary and explanatory and are intended to provide further explanation of the invention as claimed.

Advantageous Effects

According to embodiments of the present invention, a subframe of a specific type is designated within a radio frame while a legacy system (e.g., 3GPP LTE system) is supported. A user equipment can be then informed of information on the designated subframe.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

The present invention proposes a periodic setting method and a non-periodic setting method as a method of setting a subframe of a specific type within a radio frame. The subframe of the specific type can include MBSFN (Multimedia Broadcast multicast service Single Frequency Network) subframe. In case that a system supports a relay, the subframe of the specific type can include a relay subframe or a blank subframe. In case that LTE-A system is introduced as an evolved system, the subframe of the specific type can include a LTE-A subframe for supporting LTE-A system, a positioning subframe for supporting a geographical positioning of a user equipment and CSI-RS (Channel State Information-Reference signal) contained subframe in which CSI-RS for channel measurement exists, or the like.

As a type of setting a corresponding pattern periodically, it is able to consider a scheme of indicating simply the type of a specific subframe or a scheme of indicating a specific pattern about the type of the specific subframe.

The non-periodic setting method can consider a scheme of broadcasting a type of a subframe to a system at the timing point of setting the type of the subframe or a scheme of unicasting a type of a subframe to a specific user equipment (hereinafter abbreviated UE) or a target system group at the timing point of setting the type of the subframe.

First Embodiment

In the following description, a periodic setting method is explained for a method of setting a subframe of a specific type within a radio frame according to one embodiment of the present invention.

For a method of setting a subframe of a specific type within a radio frame, in case of designating the subframe of the specific type, a periodic setting method is characterized in setting a period of the designation to a predetermined value.

In particular, bitmap information, in which information on the setting of a type of each subframe within a radio frame is implemented into a bitmap, is transmitted as system information together with a period and an offset value for a start point of applying the corresponding bitmap. Alternatively, initial location information of a subframe of a specific type and information on a period indicating that the subframe of the corresponding type appears with a prescribed period are transmitted. This may correspond to a case that a subframe of a specific type defined in one radio frame has a period of the radio frame. In this case, the radio frame can include a radio FDD (frequency division duplexing) frame.

For instance, a method of designating MBSFN subframe in a radio Frequency Division Multiplexing (FDD) frame (e.g., a length of the radio frame is 10 ms) is explained as follows. First of all, a radio FDD frame (e.g., a length of the radio frame is 10 ms) is constructed with total 10 subframes (e.g., a length of each subframe is 1 ms). And, usages of some of the subframes are specified. In particular, usages of $0^{th}$, $4^{th}$, $5^{th}$, and $9^{th}$ subframes are specified. Therefore, subframes available for designating subframes of specific type within one radio FDD frame include $1^{st}$, $2^{nd}$, $3^{rd}$, $6^{th}$, $7^{th}$, and $8^{th}$ subframes.

Figure 3:
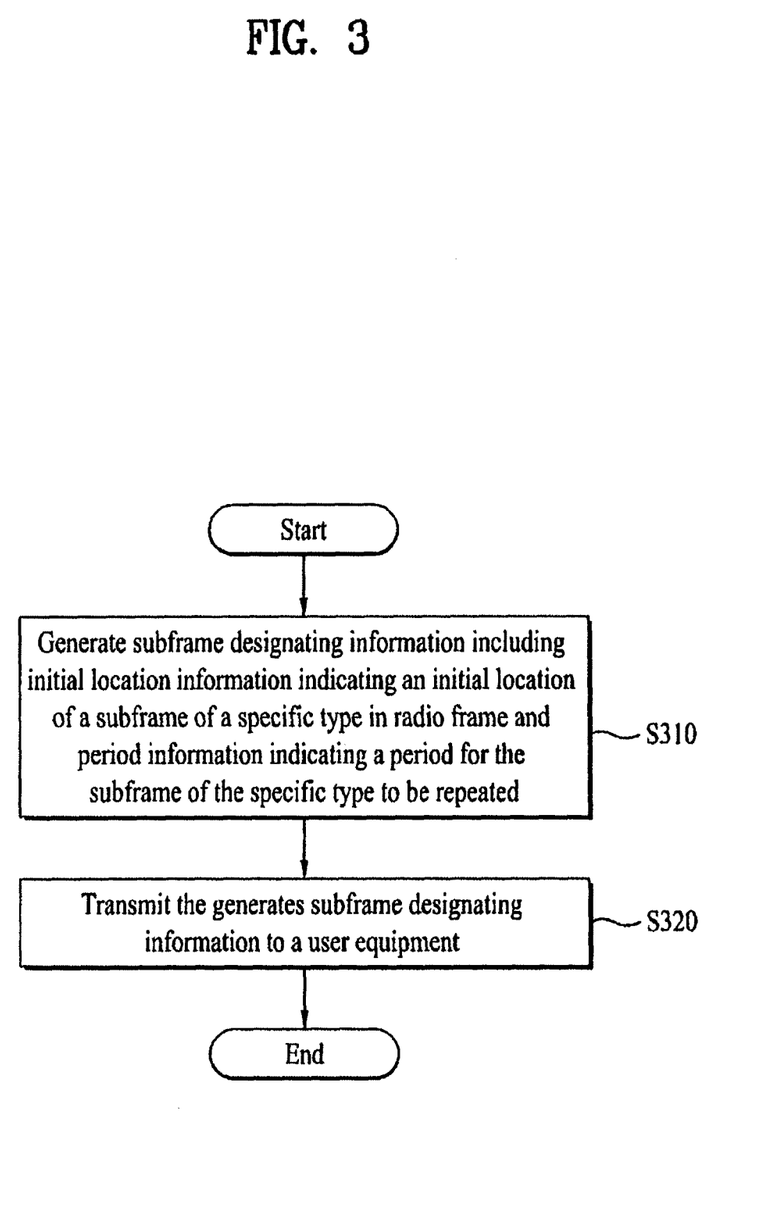
FIG. 3 is a flowchart for a method of transmitting subframe designating information including initial location information and period information of a subframe of a specific type according to one embodiment of the present invention.

FIG. 3 is a flowchart for a method of transmitting subframe designating information including initial location information and period information of a subframe of a specific type according to one embodiment of the present invention.

Referring to FIG. 3, in a radio frame, a base station generates subframe designating information including initial location information indicating an initial location of a subframe of a specific type on the radio frame and period information indicating a period of repetition of the subframe of the specific type (S310). And, the base station transmits the generated subframe designating information to a user equipment (S320).

For instance, the subframe designating information can include initial location information of the subframe designated as a specific type among $1^{st}$, $2^{nd}$, $3^{rd}$, $6^{th}$, $7^{th}$, and $8^{th}$ subframes and period information indicating a period of repetition of the subframe of the specific type.

Figure 4:
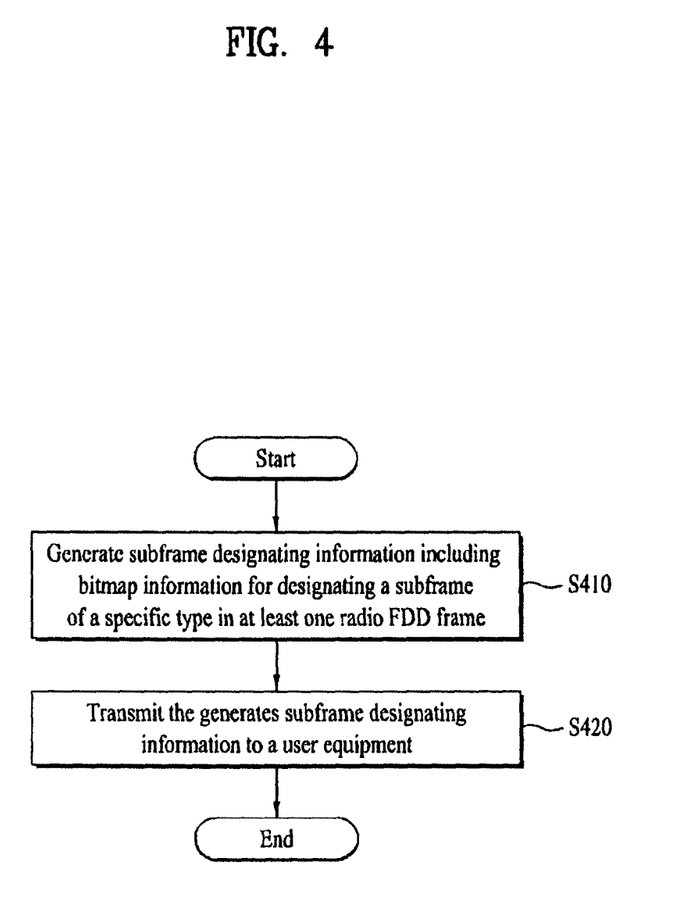
FIG. 4 is a flowchart for a method of transmitting subframe designating information including bitmap information of a subframe of a specific type according to one embodiment of the present invention.

FIG. 4 is a flowchart for a method of transmitting subframe designating information including bitmap information of a subframe of a specific type according to one embodiment of the present invention.

Referring to FIG. 4, in at least one radio FDD frame, a base station generates subframe designating information including bitmap information for designating a subframe of a specific type (S410). And, the base station transmits the generated subframe designating information to a user equipment (S420). Configurational contents of the bitmap information are explained as follows.

First of all, in configuring bitmap information for designating MBSFN subframe, in case that the MBSFN subframe is designated within one radio FDD frame, there are total six subframes including $1^{st}$, $2^{nd}$, $3^{rd}$, $6^{th}$, $7^{th}$, and $8^{th}$ subframes as subframes that can be designated as the MBSFN subframes. Hence, a bitmap is constructed with 6 bits. And, the 6 bits are allocated in a manner of setting the $1^{st}$, $2^{nd}$, $3^{rd}$, $6^{th}$, $7^{th}$, and $8^{th}$ subframes to the MBSFN subframes in order starting from the far left side of the 6 bits. If each of the bits is set to 1, it indicates that the corresponding subframe is set to the MBSFN subframe. If the corresponding bit is set to 0, it indicates that the corresponding subframe is not set to the MBSFN subframe.

Alternatively, in configuring the bitmap information, it is able to set the MBSFN subframes for the prescribed number of consecutive radio FDD frames instead of not being limited to one radio FDD frame only as mentioned in the foregoing description. For instance, in case of designating MBSFN subframes for 4 consecutive radio FDD frames, since there are 6 subframes that can be designated as the MBSFN subframes within each of the radio FDD frames, a bitmap can be constructed with 24 bits. And, the 24 bits are allocated in a manner of setting the $1^{st}$, $2^{nd}$, $3^{rd}$, $6^{th}$, $7^{th}$, and $8^{th}$ subframes included in each of the 4 consecutive radio FDD frames to the MBSFN subframes in order starting from the far left side of the 24 bits. If each of the bits is set to 1, it indicates that the corresponding subframe is set to the MBSFN subframe. If the corresponding bit is set to 0, it indicates that the corresponding subframe is not set to the MBSFN subframe.

The above described MBSFN subframe designating method is usable to designate another kind of subframe of a specific type as well as MBSFN subframe. In this case, another kind of subframe of a specific type can include a relay subframe, a positioning subframe, an LTE-A subframe and a CSI-RS contained subframe.

Particularly, since a subframe of a specific type recognized by a legacy user equipment includes only MBSFN subframe, when a subframe of a specific type is generated by Rel-9 (release-9) system or LTE-A system, if the generated subframe of the specific type is set not to be accessed by the legacy user equipment, the corresponding subframe is set to MBSFN. And, the additional setting for this can be indicated again by the above described type.

In doing so, the indicating method can be a method where the above described method is applied once more. On the contrary, a subframe, which causes no problem if accessed by a legacy user equipment, can be indicated by subframe type indication that is newly defined unlike a field indicating MBSFN subframe.

In one radio frame, a plurality of subframes of the same type can exist with different periods, respectively.

Meanwhile, in case of designating a subframe of a specific type based on a period, the subframe of the specific type can be overlapped with a specific subframe of a legacy system according to the period.

In the above explained frame structure, a physical structure of data communication uses HARQ and its period is defined as Hp (e.g., 8 ms). This means a structure that Hp processes can be carried on subframes by being interlaced, respectively. Hence, it can be observed that they can be repeated with Hp subframe interval.

On the contrary, if a transmit unit of a radio frame transmitted by a base station is set to Rp, the radio frame is repeatedly transmitted by a period Rp (e.g., 10 ms) that is the transmit unit of the radio frame.

For example, in case of LTE system, since $0^{th}$, $4^{th}$, $5^{th}$, and $9^{th}$ subframes are defined as unicast, it may happen that a period of a subframe of a specific type is periodically overlapped with the $0^{th}$, $4^{th}$, $5^{th}$, and $9^{th}$ subframes, unless the period is not a multiple of 10 ms. In this case, although the $0^{th}$, $4^{th}$ and $9^{th}$ subframes are taken as examples, they can be changed.

In LTE system, since a period of HARQ process is 8 ms, HARQ process ID rotates by 8 ms period. Hence, if a period of a subframe of a specific type is not 8 ms, it may happen that the subframe of the specific type is periodically overlapped with the HARQ process.

In order to prevent this situation, it is able to determine a period of a subframe of a specific type based on a specific rule.

In particular, a period Sp of a subframe of a specific type can be set and a window Wp connected to the period Sp can be determined. If a prohibited subframe (e.g., the $0^{th}$, $4^{th}$, $5^{th}$ or $9^{th}$ subframe in the LTE system) exists within a range of the window Wp at a position of the period Sp, it is able to set a subframe having a biggest or smallest index or a subframe closest to the Sp among the rest of the subframes except the corresponding prohibited subframe to a subframe of a specific type.

For instance, in case of LTE system, a period of a subframe of a specific type can be set to Sp=8 ms and a window can be set to Wp=3 ms. Table 1 shows a location of a subframe of a specific type if a period of a subframe of a specific type is set to Sp=8 ms and a window is set to Wp=3 ms. In Table 1, 'Rp' indicates a transmit unit of a radio frame transmitted by a base station. In Table 1, an initial location value of a subframe of a specific type is 1 and this value is changeable.

TABLE 1

| Selection reference | Subframe index |
| --- | --- |
| Smallest index | Rp * 0 + 1, Rp * 0 + 7, Rp * 1 + 7, Rp * 2 + 3, Rp * 3 + 3 |
| Biggest index | Rp * 0 + 1, Rp * 1 + 1, Rp * 1 + 7, Rp * 2 + 6, Rp * 3 + 2 |
| Index closest to Sp | Rp * 0 + 1, Rp * 0 + 8, Rp * 1 + 7, Rp * 2 + 6, Rp * 3 + 3 |

In Table 1, a subframe index indicates the $n^{th}$ time of a subframe within a radio frame.

In Table 1, if a selection criteria is to select a small index, as an initial location of a subframe of a specific type is 1 and a period Sp is 8 ms, a next subframe should be $9^{th}$. However, since the $9^{th}$ subframe is prohibited to use, if the window Wp is applied in the $9^{th}$ subframe, the window Wp is applied toward a smaller index. Hence, it is able to designate $7^{th}$ and $8^{th}$ subframes to subframes of the specific type. As it is supposed to select a subframe having the smallest index, the $7^{th}$ subframe is finally selected.

In Table 1, if a selection criteria is to select a small index, as an initial location of a subframe of a specific type is 1 and a period Sp is 8 ms, a next subframe should be $9^{th}$. However, since the $9^{th}$ subframe is prohibited to use, if the window Wp is applied in the $9^{th}$ subframe, the window Wp is applied toward a smaller index. Hence, it is able to designate $7^{th}$ and $8^{th}$ subframes to subframes of the specific type. As it is supposed to select a subframe having the smallest index, the $7^{th}$ subframe is finally selected.

In Table 1, if a selection criteria is to select a big index, as an initial location of a subframe of a specific type is 1 and a period Sp is 8 ms, a next subframe should be $9^{th}$. However, since the $9^{th}$ subframe is prohibited to use, if the window Wp is applied in the $9^{th}$ subframe, the window Wp is applied toward a bigger index. Hence, it is able to select a $1^{st}$ subframe of a next radio frame as a subframe of the specific type. Yet, as it is supposed to select a subframe having a smallest index, the $7^{th}$ subframe is finally selected.

The rest of the subframes are selected in the same manner of the above description.

In Table 1, if a selection criteria is to select an index closest to Sp, a subframe, which can be set to a subframe of a specific type by applying a period Sp, is selected from subframes of the specific type. If the subframe having the period Sp applied thereto corresponds to one of $0^{th}$, $4^{th}$, $5^{th}$ and $9^{th}$ subframes and is unable to be selected as the subframe of the specific type, subframes closest to the $0^{th}$, $4^{th}$, $5^{th}$ and $9^{th}$ are selected as the subframes of the specific type.

Although the above description is made by taking a radio FDD frame as an example, the above method is applicable to a radio TDD (time division duplexing) frame as well. For instance, a radio TDD frame includes 10 subframes. And, it is able to designate a subframe of a specific type by applying the above method to at least one of the rest of subframes except the prohibited $0^{th}$, $1^{st}$, $4^{th}$, and $5^{th}$ subframes. And, the prohibited subframes are changeable.

Second Embodiment

For a method of setting a subframe of a specific type according to one embodiment of the present invention, a hopping-pattern-based periodic setting method will be explained in the following description.

Figure 5:
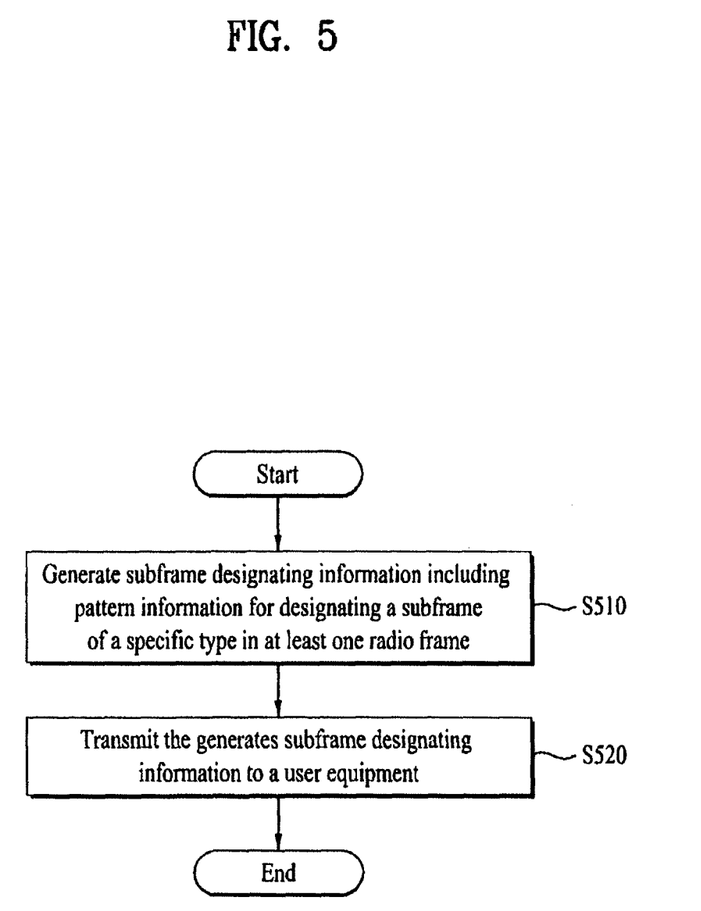
FIG. 5 is a flowchart for a method of transmitting subframe designating information including pattern information according to one embodiment of the present invention.

FIG. 5 is a flowchart for a method of transmitting subframe designating information including pattern information according to one embodiment of the present invention.

Referring to FIG. 5, in at least one or more radio frames, a base station generates subframe designating information including pattern information designating a subframe of a specific type (S510). And, the bas station transmits the generated subframe designating information to a user equipment (S520). In this case, the pattern information indicates a location of the subframe of the specific type within the radio frame as a pattern. The pattern information will be explained as follows.

First of all, according to a hopping-pattern-based periodic setting method, after a pattern of a specific from has been predetermined, it is used by being designated by a system. For instance, a pattern of uniform selection for the number of specific radio frames (i.e., Nr radio frames) is predetermined. In this case, it is able to define a offset uniform for a selected pattern in addition. After such a pattern has been defined, when a system defines a subframe of a specific type, if an initial subframe index value and pattern (offset can be announced in addition) are determined, a user equipment keeps being aware of a location of the subframe of the specific type.

Once the hoping pattern is determined in the above manner, it can be utilized to match a period failing to match another system operation by easily hopping restrictions imposed on an irregularly appearing subframe. For instance, in case of LTE system, a period of HARQ process is 8 subframes (1 ms for one subframe), a period of a $5^{th}$ radio frame is 10 subframes (1 ms for one subframe), and unusable frames are $0^{th}$, $4^{th}$, and $9^{th}$ subframes. For example, in case of generating a pattern for minimizing influence on HARQ process, Table 2 shows an example of hopping pattern in consideration of HARQ process period 8 ms.

TABLE 2

| pattern ID | Subframe index |
|---|---|
| 0 (a = 0, 1, . . . , 9) | Rp * 0 + a, Rp * 1 + a, Rp * 2 + a, Rp * 3 + a |
| 1 | Rp * [−1, 0] + [8, 1], Rp * 0 + 8, Rp * 1 + 6, Rp * 2 + [3, 6], Rp * 3 + 2 |
| 2 | Rp * 0 + 1, Rp * [0, 1] + [8, 1], Rp * 1 + 7, Rp * 2 + [3, 6], Rp * 3 + 3 |
| 3 | Rp * 0 + 2, Rp * [0, 1] + [8, 1], Rp * 1 + 8, Rp * 2 + 6, Rp * 3 + [3, 6] |
| 4 | Rp * 0 + 3, Rp * 0 + 1, Rp * [1, 2] + [8, 1], Rp * 2 + 7, Rp * 3 + [3, 6] |
| 5 | Rp * 0 + [3, 6], Rp * 1 + 2, Rp * [1, 2] + [8, 1], Rp * 2 + 8, Rp * 3 + 6 |

In this case, a generated pattern is usable in a manner that its order is randomly circular-shifted. In Table 2, [x, y] means that it can have both values of x and y. In Table 2, although prohibited subframes are $0^{th}$, $4^{th}$, $5^{th}$, and $9^{th}$ subframes, the prohibited subframes are changeable if necessary.

In the following description, for a method of setting a subframe of a specific type according to one embodiment of the present invention, a non-periodic setting method will be explained.

Third Embodiment

A non-periodic setting method is a scheme of announcing a type of a subframe based on scheduling instead of announcing a subframe type in the above-described system information format. In particular, a location of a subframe of a specific type is indicated at a start of a corresponding radio frame or a location, at which a subframe of a specific type is always located, is indicated at a location of a specific radio frame.

For instance, in LTE system, if $0^{th}$ subframe is not available for another usage, it is able to adopt a scheme of announcing a definition of one radio frame interval each time using $1^{st}$ subframe.

In this case, however, it is unable to avoid collision between the $1^{st}$ subframe and HARQ process. Therefore, it is able to consider a scheme of announcing a type of a subframe occasionally once. In particular, if a period of HARQ process is 8 ms and a period of a radio frame is 10 ms, it is able to announce information on a subframe type at a specific location each 40 or 80 ms that is the common multiple in-between. If so, as HARQ process ID experiences collision at a specific ID by a period of 40 or 80 ms only, this scheme can be regarded as a safe method. In doing so, it is possible to announce all types of subframes within a corresponding period. Such a long-duration announcement of information is possible using system information as well.

In case that a subframe type is announced using system information, the announcement can be done by setting such a scheme of a bitmap. Alternatively, a combination of the aforesaid period using method and the aforesaid hopping pattern using method is applicable to the announcement.

If the periodic method among the above described methods, when a subframe of a specific type is designated, the method of designating a subframe of a specific type by preventing a case that the subframe of the specific type is overlapped with an index of a prohibited subframe is taken into consideration. The prohibited subframe can be defined different according to a subframe of a specific type and may not exist at all.

Actually, it may, however, happen that some of the prohibited subframes are usable. For instance, in case of LTE system, there exists possibility that $0^{th}$, $5^{th}$, and $9^{th}$ subframes among $0^{th}$, $4^{th}$, $5^{th}$ and $9^{th}$ subframes are usable except the $4^{th}$ subframe. Therefore, in case of setting a period by allowing the overlapping with theses subframes, setting for the overlapped subframes is necessary. In particular, instead of using one whole subframe, OFDM symbols of the corresponding subframe are partially regarded as corresponding to a specific subframe type.

For instance, $5^{th}$ and $6^{th}$ OFDM symbols in $0^{th}$ subframe are sued as SCH and $7^{th}$ to $10^{th}$ OFDM symbols in the $0^{th}$ subframe are used as PBCH. As a common reference signal and PDCCH exist, the OFDM symbols remaining except the common reference signal and the PDCCH are designated to a specific subframe type to use. In particular, assuming that a relay uses such a subframe, when the subframe is designated to the relay, if a corresponding OFDM symbol is not for the relay, all signal should be transmitted. And, a structure enabling a different work to be done in an OFDM symbol for the relay is possible.

If a case that a specific subframe type is overlapped with an index of a prohibited subframe is allowable, an accessible method can adopt the following means different for each control channel.

SCH (Synchronization CHannel), PBCH(Physical Broadcast CHannel):

As the control signal is a signal that should be transmitted according to an initial access and intra/inter-RAT (Radio Access Technology) request, it must exist despite that a subframe type is overridden.

SIB (System Information Block):

If system information is transmitted in a structure of occupying one whole subframe, it is unable to switch a type of this subframe to another kind of subframe type. In this case, another adjacent subframe is used or hopped. If it is possible to transmit and receive signals by having the signals carried on different subcarriers on a frequency axis, respectively, a different type is usable even if such control information configured to occupy one whole subframe as SIB.

Common Reference Signal

If it is determined that common reference signals exist enough to measure a channel, it is able to decrement the number of the common reference signals. In particular, it is able to design a type of supporting common reference signals existing on specific OFDM symbol(s) instead of supporting all common reference signals spreading over one subframe, i.e., a type of allowing first one or two OFDM symbols for example of LTE system.

PDCCH (Physical Downlink Control Channel)+PHICH (Physical Hybrid ARQ Indicator CHannel):

Length of such a control channel as PDCCH and PHICH is variable according to a value of PCFICH (Physical Control Format Indicator CHannel) and can be limited to a specific value according to a subframe type. For instance, in case of a subframe type for a relay, the length can be set to 0. In case of this setting, a corresponding subframe seems to be a blank subframe in viewpoint of a user equipment or a base station.

The above-described contents are applicable to a common reference signal and PCFICH, PDCCH, PHICH and the like as well as a use-prohibited subframe.

Figure 6:
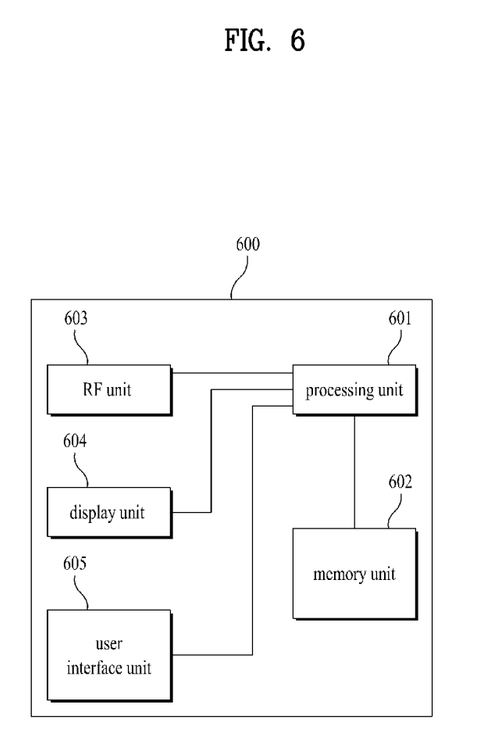
FIG. 6 is a block diagram for a configuration of a device applicable to a user equipment or a base station to implement the present invention.

FIG. 6 is a block diagram for a configuration of a device applicable to a user equipment or a base station to implement the present invention.

Referring to FIG. 6, a device 600 includes a processing unit 601, a memory unit 602, an RF (radio frequency) unit 603, a display unit 604, and a user interface unit 605. A layer of a physical interface protocol is performed by the processing unit 601. The processing unit 601 provides a control plane and a user plane. A function of each layer can be performed by the processing unit 601. The memory unit 602 is electrically connected to the processing unit 601. And, an operating system, applications, and general files are stored in the memory unit 602. If the device 600 is a user equipment, the display unit 604 is able to display various kinds of informations. And, the display unit 604 can be implemented using a well-known LCD (liquid crystal display), an OLED (organic light emitting diode) display and the like. The user interface unit 605 can be configured by being combined with such a well-known user interface as a keypad, a touchscreen, and the like. The RF unit 603 is electrically connected to the processing unit 601. The RF unit 603 transmits or receives a radio signal.

In this disclosure, embodiments of the present invention are described centering on the data transmission/reception relations between a base station and a user equipment. In this case, the base station can include eNB (evolved NodeB) and is meaningful as a terminal node of a network which directly performs communication with a user equipment. In this disclosure, a specific operation explained as performed by a base station can be performed by an upper node of the eNB in some cases.

In particular, in a network constructed with a plurality of network nodes including an eNB, various operations performed for communication with a UE can be performed by the eNB or other networks except the eNB. In this case, 'eNB' can be replaced by such a terminology as a fixed station, a Node B, an access point and the like.

And, according to the present invention, 'user equipment' corresponds to a mobile station (MS). And, the mobile station (MS) can be replaced by such a terminology as a subscriber station (SS), a mobile subscriber station (MSS), a mobile terminal and the like.

Moreover, a user equipment of the present invention can include one of PDA (Personal Digital Assistant), cellular phone, PCS (Personal Communication Service) phone, GSM (Global System for Mobile) phone, WCDMA (Wideband CDMA) phone, MBS (Mobile Broadband System) phone and the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

INDUSTRIAL APPLICABILITY

Accordingly, the present invention is applicable to an evolved system as well as a legacy system.

What is claimed is:

1. A method for receiving information by a user equipment (UE) in a wireless communication system, the method comprising:
receiving system information comprising MBSFN (Multimedia Broadcast multicast service Single Frequency Network) subframe configuration information from a base station; and
acquiring information for subframes designated as MBSFN subframes within a specific period based on the received MBSFN subframe configuration information,
wherein the MBSFN subframe configuration information includes a bitmap, wherein each of the bits in the bitmap corresponds to a subframe in a radio frame that has been designated as an MBSFN subframe, wherein less than all the subframes in the radio frame are designated as MBSFN subframes, and wherein the value of each bit in the bitmap indicates whether the corresponding subframe is set to an MBSFN subframe.

2. The method of claim 1, wherein the UE communicates with the base station using 'N' HARQ (Hybrid Automatic Repeat Request) processes, wherein 'N' is 8, and a minimum number of subframes before an HARQ retransmission is expected by the UE is 8 subframes.

3. The method of claim 1, wherein the radio frame has 10 subframes, wherein the subframes designated as MBSFN subframes are the $1^{st}$, $2^{nd}$, $3^{rd}$, $6^{th}$, $7^{th}$ and $8^{th}$ subframes, and wherein the $0^{th}$, $4^{th}$, $5^{th}$ and $9^{th}$ subframes are used for other predetermined specific purposes including reception of a synchronization channel, reception of a system information block (SIB), and for unicast communication.

4. The method of claim 1, wherein a frame has 10 subframes and the specified period is 4 consecutive frames.

5. A method for transmitting information by a base station in a wireless communication system, the method comprising:
generating system information comprising MBSFN (Multimedia Broadcast multicast service Single Frequency Network) subframe configuration information; and
transmitting the generated system information to one or more user equipments (UEs) to inform the UEs of information for subframes that are designated as MBSFN within a specific period,
wherein the MBSFN subframe configuration information includes a bitmap, wherein each of the bits in the bitmap corresponds to a subframe in a radio frame that has been designated as an MBSFN subframe, wherein less than all the subframes in the radio frame are designated as MBSFN subframes, and wherein the value of each bit in the bitmap indicates whether the corresponding subframe is set to an MBSFN subframe.

6. The method of claim 5, wherein the UEs communicate with the base station using 'N' HARQ (Hybrid Automatic Repeat Request) processes, wherein 'N' is 8, and a minimum number of subframes before an HARQ retransmission is expected by the UEs is 8 subframes.

7. The method of claim 5, wherein the radio frame has 10 subframes, wherein the subframes designated as MBSFN subframes are the $1^{st}, 2^{nd}, 3^{rd}, 6^{th}, 7^{th}$ and $8^{th}$ subframes, and wherein the $0^{th}, 4^{th}, 5^{th}$ and $9^{th}$ subframes are used for other predetermined specific purposes including reception of a synchronization channel, reception of a system information block (SIB), and for unicast communication.

8. The method of claim 5, wherein a frame has 10 subframes and the specified period is 4 consecutive frames.

9. User equipment (UE) for receiving information in a wireless communication system, the UE comprising:
an RF (Radio Frequency) unit for receiving system information comprising MBSFN (Multimedia Broadcast multicast service Single Frequency Network) subframe configuration information from a base station; and
a processing unit, electrically connected to the RF unit, for acquiring information for subframes that are designated as MBSFN subframes within a specific period based on the received MBSFN subframe configuration information,
wherein the MBSFN subframe configuration information includes a bitmap, wherein each of the bits in the bitmap corresponds to a subframe in a radio frame that has been designated as an MBSFN subframe, wherein less than all the subframes in the radio frame are designated as MBSFN subframes, and wherein the value of each bit in the bitmap indicates whether the corresponding subframe is set to an MBSFN subframe.

10. The UE of claim 9, wherein the UE communicates with the base station using 'N' HARQ (Hybrid Automatic Repeat Request) processes, wherein 'N' is 8, and a minimum number of subframes before an HARQ retransmission is expected by the UE is 8 subframes.

11. The UE of claim 9, wherein the radio frame has 10 subframes, wherein the subframes designated as MBSFN subframes are the $1^{st}, 2^{nd}, 3^{rd}, 6^{th}, 7^{th}$ and $8^{th}$ subframes, and wherein the $0^{th}, 4^{th}, 5^{th}$ and $9^{th}$ subframes are used for other predetermined specific purposes including reception of a synchronization channel, reception of a system information block (SIB), and for unicast communication.

12. The UE of claim 9, wherein a frame has 10 subframes and the specified period is 4 consecutive frames.

13. A base station for transmitting information in a wireless communication system, the base station comprising:
a processing unit for generating system information comprising MBSFN (Multimedia Broadcast multicast service Single Frequency Network) subframe configuration information; and
an RF (Radio Frequency) unit, electrically connected to the processing unit, for transmitting the generated system information to one or more user equipments (UEs) to inform the UEs of information for subframes that are designated as MBSFN subframes within a specific period,
wherein the MBSFN subframe configuration information includes a bitmap, wherein each of the bits in the bitmap corresponds to a subframe in a radio frame that has been designated as an MBSFN subframe, wherein less than all the subframes in the radio frame are designated as MBSFN subframes, and wherein the value of each bit in the bitmap indicates whether the corresponding subframe is set to an MBSFN subframe.

14. The base station of claim 13, wherein the UEs communicate with the base station using 'N' HARQ (Hybrid Automatic Repeat Request) processes, wherein 'N' is 8, and a minimum number of subframes before an HARQ retransmission is expected by the UEs is 8 subframes.

15. The base station of claim 13, wherein the radio frame has 10 subframes, wherein the subframes designated as MBSFN subframes are the $1^{st}, 2^{nd}, 3^{rd}, 6^{th}, 7^{th}$ and $8^{th}$ subframes, and wherein the $0^{th}, 4^{th}, 5^{th}$ and $9^{th}$ subframes are used for other predetermined specific purposes including reception of a synchronization channel, reception of a system information block (SIB), and for unicast communication.

16. The base station of claim 13, wherein a frame has 10 subframes and the specified period is 4 consecutive frames.

* * * * *